(12) United States Patent
Michl et al.

(10) Patent No.: US 6,844,410 B2
(45) Date of Patent: Jan. 18, 2005

(54) PREPARATION OF AN AQUEOUS COPOLYMER SOLUTION

(75) Inventors: Kathrin Michl, Ludwigshafen (DE); Matthias Gerst, Neustadt (DE); Matthias Laubender, Schifferstadt (DE); Dieter Faul, Niederkirchen (DE); Hans-Jürgen Raubenheimer, Ketsch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/443,096

(22) Filed: May 22, 2003

(65) Prior Publication Data

US 2003/0225204 A1 Dec. 4, 2003

(30) Foreign Application Priority Data

Jun. 4, 2002 (DE) .......................... 102 24 922

(51) Int. Cl.$^7$ ..................... C08F 220/04; C08F 220/34; C08F 222/00; C08F 2/10; C08F 2/44
(52) U.S. Cl. ..................... 526/312; 524/812; 524/832; 526/89; 526/318.4
(58) Field of Search ................. 526/312, 89, 318.4; 524/812, 832, 378, 377, 376, 558, 556

(56) References Cited

U.S. PATENT DOCUMENTS 5,661,206 A * 8/1997 Tanaka et al. .............. 524/378

FOREIGN PATENT DOCUMENTS

| DE | 43 11 916 | 10/1994 |
| DE | 196 53 524 | 6/1998 |
| DE | 199 49 591 A1 | 4/2001 |
| WO | WO 95/09876 | 4/1995 |

OTHER PUBLICATIONS

Translation to DE 19949591.*

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

The present invention provides a process for preparing aqueous copolymer solutions by polymerizing ethylenically unsaturated compounds in the presence of foam inhibitors.

20 Claims, No Drawings

US 6,844,410 B2

PREPARATION OF AN AQUEOUS COPOLYMER SOLUTION

The present invention relates to a process for preparing an aqueous solution of a copolymer made up of
a) from 50 to 99.5% by weight of at least one ethylenically unsaturated monocarboxylic and/or dicarboxylic acid [monomer A],
b) from 0.5 to 50% by weight of at least one ethylenically unsaturated compound selected from esters of ethylenically unsaturated monocarboxylic acids and monoesters and diesters of ethylenically unsaturated dicarboxylic acids with an amine containing at least one hydroxyl group [monomer B], and optionally
c) up to 20% by weight of at least one further monomer [monomer C],
in polymerized form, which comprises polymerizing monomers A, B and C in an aqueous medium in the presence of at least one foam inhibitor.

DE-A 19949591 discloses heat-curable binder compositions comprising as essential components copolymers with the aforementioned composition and also at least one relatively high-functionality β-hydroxyalkylamine and optionally a surfactant. The copolymers are preferably prepared by subjecting the aforementioned monomers A, B and C to free-radically induced polymerization in an aqueous medium and then blending the product with the relatively high-functionality β-hydroxyalkylamine and the optionally employed surfactant. The polymerization reaction takes place customarily under superatmospheric pressure. A problem with this process is that the subsequent letdown of the stirred aqueous copolymer solution to atmospheric pressure is frequently accompanied by severe foaming, which makes it more difficult to blend the product homogeneously with the further components—β-hydroxyalkylamine and surfactant—and retards the subsequent full emptying of the reaction vessel. In order to shorten the reactor occupancy times, therefore, the foam formed was subsequently reduced using foam inhibitors. A disadvantage of this method is that the subsequently added foam inhibitors are difficult to stir into the aqueous copolymer solutions owing to the existing foam, and so the time taken to reduce the foam, and hence the reactor occupancy times, are unsatisfactory.

It is an object of the invention to shorten the reactor occupancy times during the preparation of the aforementioned aqueous copolymer solutions, by avoiding or preventing the formation of foam.

We have found that this object is achieved by the invention defined at the outset.

The carboxyl-containing copolymers of the invention accordingly contain in incorporated form as monomers A from 50 to 99.5% by weight, preferably from 70 to 99% by weight, of structural units deriving from ethylenically unsaturated monocarboxylic acids and ethylenically unsaturated dicarboxylic acids. Within the copolymer these acids may also be present partly or completely in the form of a salt. The acidic form is preferred.

In the preparation of the carboxyl-containing copolymer it is also possible in addition to the aforementioned monomers A to use the anhydrides of the ethylenically unsaturated monocarboxylic acids and the anhydrides of the ethylenically unsaturated dicarboxylic acids.

Particularly preferred monomers A for preparing the carboxyl-containing copolymers are maleic acid, maleic anhydride, acrylic acid, methacrylic acid, acrylic anhydride, methacrylic anhydride, crotonic acid, itaconic acid, and 1,2,3-tetrahydrophthalic acid, and also the alkali metal salts and ammonium salts or mixtures thereof.

With particular preference the copolymer contains in incorporated form structural elements which derive from acrylic acid or from a mixture of acrylic and maleic acid in a 95:5 to 40:60 ratio, in particular in a 90:10 to 50:50 ratio.

The copolymer of the invention further contains as monomer B in copolymerized form from 0.5 to 50% by weight, preferably from 1 to 30% by weight, of at least one ethylenically unsaturated compound selected from the esters of ethylenically unsaturated monocarboxylic acids and the monoesters and diesters of ethylenically unsaturated dicarboxylic acids with at least one hydroxyl-containing amine.

Monocarboxylic acids suitable as a component of the esters include the aforementioned $C_3$ to $C_{10}$ monocarboxylic acids, especially acrylic, methacrylic and crotonic acid, and mixtures thereof.

Dicarboxylic acids suitable as components of the monoesters and diesters include the aforementioned $C_4$ to $C_8$ dicarboxylic acids, especially fumaric acid, maleic acid, 2-methylmaleic acid, itaconic acid, and mixtures thereof.

The amine containing at least one hydroxyl group is preferably selected from secondary and tertiary amines containing at least one $C_6$ to $C_{22}$ alkyl, $C_6$ to $C_{22}$ alkenyl, aryl-$C_6$–$C_{22}$-alkyl or aryl-$C_6$–$C_{22}$-alkenyl radical, the alkenyl group containing 1, 2 or 3 nonadjacent double bonds.

The amine is preferably hydroxyalkylated and/or alkoxylated. Alkoxylated amines contain preferably one or two alkylene oxide residues with terminal hydroxyl groups. The alkylene oxide residues preferably have in each case from 1 to 100, more preferably from 1 to 50, identical or different alkylene oxide units, distributed at random or in the form of blocks. Preferred alkylene oxides are ethylene oxide, propylene oxide and/or butylene oxide. Ethylene oxide is particularly preferred.

The polymer preferably contains an unsaturated compound based on an amine component which contains in incorporated form at least one amine of the formula I $$R^cNR^aR^b \qquad (I)$$

where
$R^c$ is $C_6$ to $C_{22}$ alkyl, $C_6$ to $C_{22}$ alkenyl, aryl-$C_6$–$C_{22}$-alkyl or aryl-$C_6$–$C_{22}$-alkenyl, the alkenyl radical having 1, 2 or 3 nonadjacent double bonds, $R^a$ is hydroxy-$C_1$–$C_6$-alkyl or a radical of the formula II $$-(CH_2CH_2O)_x(CH_2CH(CH_3)O)_y-H \qquad (II)$$

where
the sequence of the alkylene oxide units is arbitrary and x and y independently are each a number from 0 to 100, preferably from 0 to 50, and the sum of x and y is >1, $R^b$ is hydrogen, $C_1$ to $C_{22}$ alkyl, hydroxy-$C_1$–$C_6$-alkyl, $C_6$ to $C_{22}$ alkenyl, aryl-$C_6$–$C_{22}$-alkyl, aryl-$C_6$–$C_{22}$-alkenyl or $C_5$ to $C_8$ cycloalkyl, the alkenyl radical having 1, 2 or 3 nonadjacent double bonds, or Rb is a radical of the formula III $$-(CH_2CH_2-)_v(CH_2CH(CH_3)O)_w-H \qquad (III)$$

where
the sequence of the alkylene oxide units is arbitrary and v and w independently are each an integer from 0 to 100, preferably from 0 to 50.

Preferably, $R^c$ is $C_8$ to $C_{20}$ alkyl or $C_8$ to $C_{20}$ alkenyl, the alkenyl radical having 1, 2 or 3 nonadjacent double bonds. Preferably, $R^c$ is the hydrocarbon radical of a saturated or mono- or polyunsaturated fatty acid. Preferred radicals $R^c$ include for example n-octyl, ethylhexyl, undecyl, lauryl, tridecyl, myristyl, pentadecyl, palmityl, margarinyl, stearyl, palmitoleyl, oleyl and linolyl.

The amine component is preferably an alkoxylated fatty amine or an alkoxylated mixture of fatty amines. The ethoxylates are particularly preferred. Use is made in particular of alkoxylates of amines based on naturally occurring fatty acids, such as tallow fatty amines, which contain predominantly saturated and unsaturated $C_{14}$, $C_{16}$ and $C_{18}$ alkylamines, or coconut amines, which contain saturated and singly and doubly unsaturated $C_6$ to $C_{22}$ alkyl amines, preferably $C_{12}$ to $C_{14}$ alkylamines. Examples of amine mixtures suitable for alkoxylation are various Armeen® grades from Akzo or Noram® grades from Ceca.

Suitable commercially available alkoxylated amines are, for example, the Noramox® grades from Ceca, preferably ethoxylated oleyl amines, such as Noramox® 05 (5 EO units), and the BASF AG products sold under the brand name Lutensol®FA.

The copolymerization of the aforementioned esters, monoesters, and diesters generally has the effect of reducing the surface tension of the compositions of the invention.

The esterification for preparing the afore described esters, monoesters, and diesters takes place in accordance with customary methods known to the skilled worker. To prepare esters of unsaturated monocarboxylic acids it is possible to use the free acids or suitable derivatives, such as anhydrides, halides, such as chlorides, and $C_1$ to $C_4$ alkyl esters. Monoesters of unsaturated dicarboxylic acids are preferably prepared starting from the corresponding dicarboxylic anhydrides. The reaction takes place with preference in the presence of a catalyst, such as a dialkyl titanate or an acid, such as sulfuric acid, toluene sulfonic acid or methane sulfonic acid, for example. The reaction takes place in general at reaction temperatures of from 60 to 200 C. In one suitable embodiment the reaction takes place in the presence of an inert gas, such as nitrogen. Water formed during the reaction can be removed from the reaction mixture by means of appropriate measures, such as distillation. The reaction may take place if desired in the presence of customary polymerization inhibitors. The esterification reaction can be carried through essentially to completion or only to a certain partial conversion. If desired, one of the ester components, preferably the hydroxyl-containing amine, can be used in excess. The extent of esterification can be determined by means of infrared spectroscopy.

In many cases the monomers B can also be prepared by reacting a dicarboxylic anhydride with an amine of the formula I in an aqueous medium under an inert gas atmosphere at a pressure ≧atmospheric pressure, i.e., at a pressure ≧1.1 bar, ≧1.5 bar, ≧2 bar, or ≧5 bar (absolute), the reaction pressure normally not exceeding a maximum of 7 bar or 10 bar (absolute).

In one preferred embodiment the unsaturated esters or monoesters are prepared and are reacted further to give the inventively employed copolymers without isolating the esters, the two reactions preferably taking place one after the other in the same reaction vessel.

To prepare the copolymers it is preferred to use a reaction product of a dicarboxylic anhydride, preferably maleic anhydride, and one of the above-described hydroxyl-containing amines.

In one suitable embodiment the copolymers of the invention contain incorporated in polymerized form as further monomer C at least one compound selected from olefins, preferably ethene, propene, n-butene, isobutene and/or diisobutene, vinyl aromatics, preferably styrene, esters of α,β-ethylenically unsaturated monocarboxylic and/or dicarboxylic acids with $C_1$ to $C_{22}$ alkanols, preferably (meth)acrylic esters, and mixtures thereof.

Preferred further monomers C are linear and branched-chain 1-olefins or cyclic olefins such as ethene, propene, butene, isobutene, diisobutene, pentene, cyclopentene, hexene, cyclohexene, octene, 2,4,4-trimethyl-1-pentene alone or in a mixture with 2,4,4-trimethyl-2-pentene, $C_8$ to $C_{10}$ olefin, 1-dodecene, $C_{12}$ to $C_{14}$ olefin, octadecene, 1-eicosene ($C_{20}$), $C_{20}$ to $C_{24}$ olefin; oligoolefins prepared by metallocene catalysis and containing a terminal double bond, such as oligopropene, oligohexene, and oligooctadecene; olefins prepared by cationic polymerization with a high α-olefin fraction, such as polyisobutene;

esters of preferably $C_3$ to $C_6$ α,β-monoethylenically unsaturated monocarboxylic or dicarboxylic acids such as acrylic, methacrylic, maleic, fumaric, and itaconic acid, with $C_1$ to $C_{12}$, preferably $C_1$ to $C_8$ alkanols. Particular such esters are methyl, ethyl, n-butyl, isobutyl, tert-butyl, n-pentyl, isopentyl, and 2-ethylhexyl acrylate and/or methacrylate;

vinyl aromatic compounds, preferably styrene, α-methylstyrene, o-chlorostyrene, vinyltoluenes, and mixtures thereof.

Particularly preferred further monomers C are ethene, propene, isobutene, diisobutene, styrene, methyl (meth)acrylate, ethyl (meth)acrylate, n-butyl (meth)acrylate, 2-ethylhexyl (meth)acrylate and mixtures thereof.

The monomers A, B, and C are normally polymerized in water as solvent. It is, however, also possible for water-miscible organic solvents, such as alcohols and ketones, examples being methanol, ethanol, n-propanol, isopropanol, n-butanol, acetone, and methyl ethyl ketone, to be present at up to about 30% by volume.

The polymerization is conducted preferably in the presence of compounds which form free radicals (initiators). The amount needed of these compounds is preferably from 0.05 to 10% by weight, more preferably from 0.2 to 5% by weight, based on the total monomer amount employed in the polymerization.

Examples of suitable polymerization initiators include peroxides, hydroperoxides, peroxodisulfates, percarbonates, peroxoesters, hydrogen peroxide, and azo compounds. Examples of initiators, which may be soluble or else insoluble in water, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium, and ammonium peroxodisulfate, azodiisobutyronitrile, 2,2'-azobis(2-amidinopropane) dihydrochloride, 2-(carbamoylazo) isobutyronitrile, and 4,4-azobis(4-cyanovaleric acid). Additionally, the known redox initiator systems, such as $H_2O_2$/ascorbic acid or tert-butylhydroperoxide/sodium hydroxymethanesulfinate, may be used as polymerization initiators.

The initiators can be employed alone or in a mixture with one another, an example being mixtures of hydrogen peroxide and sodium peroxodisulfate. For the polymerization in an aqueous medium it is preferred to use water-soluble initiators.

Essential to the process is that the polymerization of the monomers A, B and C take place in an aqueous medium in the presence of at least one foam inhibitor. For the purposes of this text, foam inhibitors are all compounds capable of preventing or at least reducing the formation of foam and/or of reducing foam which has already formed in an aqueous medium comprising the copolymer formed from the monomers A, B, and C. Suitable compounds are known to the skilled worker (see, for example, Ullmann's encyclopedia of industrial chemistry, $5^{th}$ edition, Vol. All, pages 465 to 490, VCH Verlagsgesellschaft mbH, Weinheim, 1988 or Römpp-Lexikon Chemie, $10^{th}$ edition, Vol. 5, page 3953, Georg Thieme Verlag, Stuttgart, 1999, and the literature references in both these works) or can be determined by said skilled worker in simple tests, based for example on DIN 53902 Part 2.

As foam inhibitors it is possible in particular to use compounds selected from silicone oils, especially dimethylpolysiloxanes, such as TEGO Antifoam®730 (brand name of the company Goldschmidt), phosphoric esters, such as Degressal® SD 40 or Etingal® S (brand names of the company BASF AG), fatty alcohol alkoxylates, such as Degressal® SD 20, Degressal® SD 21 or Degressal® SD 22, Degressal® SD 23 or Lumiten® E 3065 (brand names of the company BASF AG), ethylene oxide/propylene oxide block copolymers, especially ethoxylated polypropylene glycols or propoxylated polyethylene glycols, such as the Pluronic® PE or Pluronic® RPE grades from BASF AG, for example, and also ethoxylated or propoxylated mono-, di- or polyamines, such as the Tetronic® RED grades-from BASF AG, for example.

The total amount of foam inhibitor used is frequently from 0.001 to 5 parts by weight and often from 0.005 to 2 parts by weight or from 0.01 to 1 part by weight, based in each case on 100 parts by weight of the total monomer amount.

In one preferred embodiment of the process of the invention
i) monomer B is prepared by reacting at least one ethylenically unsaturated monocarboxylic acid or derivative thereof and/or at least one ethylenically unsaturated dicarboxylic acid or derivative thereof with an amine containing at least one hydroxyl group in an esterification reaction and then
ii) polymerizing the reaction product from step i) in an aqueous medium in the presence of at least one foam inhibitor with at least one monomer A and/or its anhydride and, if desired, at least one monomer C.

The derivatives of the ethylenically unsaturated monocarboxylic and/or dicarboxylic acids that are optionally used in step i) are with advantage the anhydrides of the corresponding monocarboxylic and/or dicarboxylic acids.

In the process of the invention it is possible with advantage to charge where appropriate a portion of said at least one foam inhibitor to a reaction vessel together with monomer B and to supply the entirety or any remainder of said at least one foam inhibitor together with monomer A and, optionally, monomer C during the polymerization reaction, in particular continuously. An alternative option is to charge the entirety of said at least one foam inhibitor to a reaction vessel together with monomer B and to add monomer A and, optionally, monomer C during the polymerization reaction, in particular continuously.

The aqueous copolymer solutions obtained normally have a solids content of $\geq 5$ to $\leq 70\%$ by weight, frequently $\geq 20$ to $\leq 60\%$ by weight, and often $\geq 30$ to $\leq 50\%$ by weight, based in each case on the aqueous copolymer solutions.

The aqueous solutions of the copolymers made up of the monomers A, B, and C that are obtainable by the process of the invention can be blended as disclosed in DE-A 19949591 to form heat-curable binder compositions comprising as essential components a copolymer with the abovementioned composition and also at least one relatively high-functionality β-hydroxyalkylamine and optionally a surfactant and also further additives, and used to produce moldings.

The nonlimiting examples hereinbelow are illustrative of the invention.

The viscosity of the compositions was determined in a Brookfield DV 2 viscometer at 23° C. and 60 rpm using a size 2 or 3 spindle.

The pH was measured with a combined pH electrode.

EXAMPLE 1

Polymer of 3 parts carboxylic acid monomers and 1 part ethoxylated oleylamine

A pressure reactor (anchor stirrer, 2 feed ports) was charged with 152.0 kg of deionized water, 67.3 kg of maleic anhydride, 0.88 kg of TEGO Antifoam® 730 (defoamer from Goldschmidt) and 221.6 kg of Lutensol® FA 12 (ethoxylated oleylamine from BASF AG). Where necessary, 0.3% by weight (based on the total amount of the monomers) of phosphorus-containing inorganic acids was added as corrosion inhibitor.

The mixture was heated to 120–125° C. under nitrogen. After the mixture had reached this temperature, feed stream 1, consisting of 174.6 kg of deionized water and 186.0 kg of acrylic acid, was metered in at a uniform rate over the course of 4 hours and feedstream 2, consisting of 34.4 kg of deionized water and 21.3 kg of 30% strength by weight aqueous hydrogen peroxide solution, was metered in at a uniform rate over the course of 5 hours. After the end of feed stream 1 a further 28.8 kg of deionized water were added to the reaction mixture. During the polymerization the pressure was maintained at 2–3 bar by careful let down. After the end of the reaction the reaction mixture was let down to atmospheric pressure and cooled to 30–35° C., which took about 15 minutes. Then 114.0 kg of triethanolamine were passed with cooling into the reaction mixture.

The finished polymer solution had a pH 3.5 and a viscosity of 598 mPa*s and was containerized via a filter within 10 minutes.

EXAMPLE 2

Polymer of 3 parts carboxylic acid monomers and 1 part ethoxylated oleylamine

A pressure reactor (anchor stirrer, 2 feed ports) was charged with 152.0 kg of deionized water, 67.3 kg of maleic anhydride, and 221.6 kg of Lutensol® FA 12. Where necessary, 0.3% by weight (based on the total amount of the monomers) of phosphorus-containing inorganic acids was added as corrosion inhibitor.

The mixture was heated to 120–125° C. under nitrogen. After the mixture had reached this temperature, feed stream 1, consisting of 174.6 kg of deionized water, 186.0 kg of acrylic acid and 0.88 kg of TEGO Antifoam® 730, was metered in at a uniform rate over the course of 4 hours and feedstream 2, consisting of 34.4 kg of deionized water and 21.3 kg of 30% strength by weight aqueous hydrogen peroxide solution, was metered in at a uniform rate over the course of 5 hours. After the end of feed stream 1 a further 28.8 kg of deionized water were added to the reaction mixture. During the polymerization the pressure was maintained at 2–3 bar by careful letdown. After the end of the reaction the reaction mixture was let down to atmospheric pressure and cooled to 30–35° C., which took about 15 minutes. Then 114.0 kg of triethanolamine were passed with cooling into the reaction mixture.

The finished polymer solution had a pH 3.5 and a viscosity of 584 mPa*s and was containerized via a filter within 10 minutes.

Comparative example (no foam inhibitor)

A pressure reactor (anchor stirrer, 2 feed ports) was charged with 152.0 kg of deionized water, 67.3 kg of maleic anhydride, and 221.6 kg of Lutensol® FA 12. Where necessary, 0.3% by weight (based on the total amount of the monomers) of phosphorus-containing inorganic acids was added as corrosion inhibitor.

The mixture was heated to 120–125° C. under nitrogen. After the mixture had reached this temperature, feed stream 1, consisting of 174.6 kg of deionized water and 186.0 kg of acrylic acid, was metered in at a uniform rate over the course of 4 hours and feedstream 2, consisting of 34.4 kg of deionized water and 21.3 kg of 30% strength by weight aqueous hydrogen peroxide solution, was metered in at a uniform rate over the course of 5 hours. After the end of feed stream 1 a further 28.8 kg of deionized water were added to the reaction mixture. During the polymerization the pressure was maintained at 2–3 bar by careful letdown. After the end of the reaction the reaction mixture was let down to atmospheric pressure and cooled to 30–35° C. As a result of severe foaming, the letdown operation was slow and observed to be accompanied by continual development of foam. Overall, the procedure of letdown and cooling took about 45 minutes. Then 114.0 kg of triethanolamine were passed with cooling into the reaction mixture.

The finished polymer solution had a pH 3.5 and a viscosity of 595 mPa*s and was containerized via a filter within 50 minutes.

We claim:

1. A process for preparing an aqueous solution of a copolymer comprising:
   a) from 50 to 99.5% by weight of at least one ethylenically unsaturated monocarboxylic and/or dicarboxylic acid monomer A
   b) from 0.5 to 50% by weight of at least one ethylenically unsaturated compound selected from esters of ethylenically unsaturated monocarboxylic acids with an amine containing at least one hydroxyl group and monoesters and diesters of ethylenically unsaturated dicarboxylic acids with an amine containing at least one hydroxyl group
   in polymerized form, which comprises polymerizing monomers A and B in an aqueous medium in the presence of at least one foam inhibitor.

2. A process as claimed in claim 1, wherein monomer A from is at least one compound selected from $C_3$ to $C_{10}$ monocarboxylic and $C_4$ to $C_8$ dicarboxylic acids.

3. A process as claimed in claim 2, wherein monomer A is acrylic acid or a mixture of acrylic acid and maleic acid or maleic anhydride in a molar ratio of from 95:5 to 40:60.

4. A process as claimed in claim 1, wherein the amine containing a hydroxyl group is selected from amines of the formula I $$R^c NR^2 R^b \quad (I),$$ 

where
  $R^c$ is $C_6$ to $C_{22}$ alkyl, $C_6$ to $C_{22}$ alkenyl, aryl-$C_6$–$C_{22}$-alkyl or aryl-$C_6$–$C_{22}$-alkenyl, the alkenyl radical having 1, 2 or 3 nonadjacent double bonds,
  $R^a$ is hydroxy-$C_1$–$C_6$-alkyl or a radical of the formula II $$-(CH_2CH_2O)_x(CH_2CH(CH_3)O)_y-H \quad (II)$$ 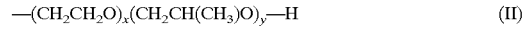

where
  the sequence of the alkylene oxide units is arbitrary and x and y independently are each an integer from 0 to 100, and the sum of x and y is >1,
  $R^b$ is hydrogen, $C_1$ to $C_{22}$ alkyl, hydroxy-$C_1$–$C_6$-alkyl, $C_6$ to $C_{22}$ alkenyl, aryl-$C_6$–$C_{22}$-alkyl, aryl-$C_6$–$C_{22}$-alkenyl or $C_5$ to $C_8$ cycloalkyl, the alkenyl radical having 1, 2 or 3 nonadjacent double bonds,
  or $R^b$ is a radical of the formula III $$-(CH_2CH_2O)_v(CH_2CH(CH_3)O)_w-H \quad (III)$$ 

where
  the sequence of the alkylene oxide units is arbitrary and v and w independently are each an integer from 0 to 100,
  and mixtures thereof.

5. A process as claimed in claim 1, wherein the polymerization reaction takes place in the presence of from 0.001 to 5 parts by weight of at least one foam inhibitor per 100 parts by weight of the total monomer amount.

6. A process as claimed in claim 1, wherein said foam inhibitor is at least one compound selected from the group consisting of silicone oils, phosphoric esters, fatty alcohol alkoxylates, ethylene oxide/propylene oxide block copolymers, and alkoxylated monoamines, diamines, and polyamines.

7. A process as claimed in claim 1,
wherein
  i) monomer B is prepared by reacting at least one ethylenically unsaturated monocarboxylic acid or derivative thereof and/or at least one ethylenically unsaturated dicarboxylic acid or derivative thereof with an amine containing at least one hydroxyl group in an esterification reaction and then
  ii) polymerizing the reaction product from step i) in an aqueous medium in the presence of at least one foam inhibitor with at least one monomer A and/or its anhydride.

8. A process as claimed in claim 7, wherein a portion of said foam inhibitor is charged to a reaction vessel together with monomer B and remainder of said foam inhibitor is supplied together with monomer A during the polymerization reaction.

9. A process as claimed in claim 7, wherein the entirety of said foam inhibitor is charged to a reaction vessel together with monomer B, while monomer A is supplied during the polymerization reaction.

10. A process as claimed in claim 1, wherein the polymerization reaction is free-radically initiated.

11. A process as claimed in claim 7, wherein the entirety of said foam inhibitor is charged to a reaction vessel together with monomer A during the polymerization reaction.

12. A process as claimed in claim 1, wherein the copolymer further comprises up to 20% by weight at least one further monomer B.

13. A process as claimed in claim 12, wherein monomer C is at least one compound selected from ethene, propene, n-butene, isobutene and/or diisobutene, vinyl aromatics, esters of α,β-ethylenically unsaturated monocarboxylic and/or dicarboxylic acids with C1 to C22 alkanols and mixtures thereof.

14. A process as claimed in claim 2, wherein monomer A is at least one compound selected from the group consisting of acrylic acid, methacrylic acid, crotonic acid, fumaric acid, maleic acid, 2-methylmaleic acid, and itaconic acid.

15. A process as claimed in claim 3, wherein monomer A is acrylic acid or a mixture of acrylic acid and maleic acid or maleic anhydride in a molar ratio of from 90:10 to 50:50.

16. A process as claimed in claim 13, wherein monomer C is at least one compound selected from the group consisting of styrene, acrylic esters, methacrylic esters and mixtures thereof.

17. The process as claimed in claim 12, wherein
  i) monomer B is prepared by reacting at least one ethylenically unsaturated monocarboxylic acid or derivative thereof and/or at least one ethylenically unsaturated dicarboxylic acid or derivative thereof with an amine containing at least one hydroxyl group in an esterification reaction and then
  ii) polymerizing the reaction product from step i) in an aqueous medium in the presence of at least one foam inhibitor with at least one monomer A and/or its anhydride and at least one monomer C.

18. A process as claimed in claim 17, wherein a portion of said foam inhibitor is charged to a reaction vessel together with monomer B and remainder of said foam inhibitor is supplied together with monomer A and monomer C during the polymerization reaction.

19. A process as claimed in claim 17, wherein the entirety of said foam inhibitor is charged to a reaction vessel together with monomer B, while monomer A and monomer C are supplied during the polymerization reaction.

20. A process as claimed in claim 17, wherein the entirety of said foam inhibitor is charge to a reaction vessel together with monomer A and monomer C during the polymerization reaction.

\* \* \* \* \*